United States Patent Office 3,053,733
Patented Sept. 11, 1962

3,053,733
ANTHELMINTIC COMPOSITION AND METHOD OF USING SAME
Franklin S. Chance, Hollis, and Edward G. Martin, East Northport, N.Y., assignors to Chas. Pfizer & Co., Inc., New York, N.Y., a corporation of Delaware
No Drawing. Filed July 27, 1959, Ser. No. 829,509
8 Claims. (Cl. 167—53)

This invention is concerned with an improved method for the treatment of helminth infection and with a group of novel compositions useful for this purpose. More particularly, the present improvement entails the use of novel resin derivatives of the cyanine dye, dithiazanine.

Helminth infection is encountered in a large proportion of the human and animal population in many regions of the world. Among the causative pathogens are the roundworms: *Enterobius vermicularis*, or pinworm, *Ascaris lumbricoides*, or giant roundworm, *Necator americanus*, or tropical hookworm, *Strongyloides stercoralis*, or threadworm, and *Trichuris trichiura*, or whipworm. A number of therapeutic agents have been suggested for the treatment of such infestations, and recently a drug known as dithiazanine has been proposed. This substance has the advantage of being effective against a wide variety of helminths and in some infections is already considered the treatment of choice.

However, full utilization of the advantages of this valuable drug has been hampered by the side effects encountered. Dithiazanine exerts a local irritant effect on the gastrointestinal mucosa, sometimes causing nausea, vomiting and diarrhea. While the vomiting is usually limited to single episode during a course of treatment, the drug has been contraindicated in any condition that may be aggravated by vomiting. The expedients which have previously been tested in an attempt to remedy this problem have not been entirely satisfactory. For example, the conventional methods of enteric coating have reduced, but have not eliminated these undesirable side effects.

Now it has been unexpectedly discovered that these side effects are largely eliminated by administering dithiazanine in the form of novel resin derivatives, thereby substantially increasing the utility and value of the drug. In addition to this significant advantage, the new compositions can be prepared in the form of palatable, finely divided powders which are conveniently administered in a variety of forms to humans and animals. The novel compositions of the present invention reproducibly release the active drug in the gastrointestinal tract and are not subject to the variation in disintegration time encountered with conventional dosage forms.

Dithiazanine is a cyanine dye whose iodide salt has the following structural formula:

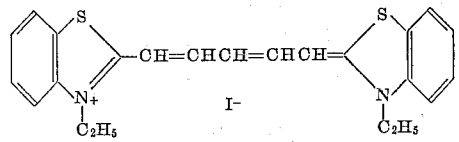

This material can be synthesized by the reaction of 2-methylbenzthiazole ethiodide with β-anilinoacrolein anil as is described by Ogata in the Proceedings of the Imperial Academy of Tokyo, vol. 9, p. 602 (1933). An abstract of this article appears in Chemical Abstracts, vol. 28, p. 2007 (1934). Dithiazanine is a light green crystalline substance which is insoluble in ether and slightly soluble in the lower alkanols, chlorinated aliphatic hydrocarbons, and water. It forms deep blue solutions in these solvents and the alcoholic solutions exhibit a strong red fluorescence. The material has a melting point of 250° C.

According to the present invention, dithiazanine, conveniently in the form of a salt, such as the bromide or iodide, is adsorbed on a synthetic cross-linked cation exchange resin. The resin may be of either the carboxylic or the sulfonic type.

Suitable carboxylic resins are the insoluble, infusible copolymers of a mono-unsaturated carboxylic acid and a cross-linking agent, that is, a compound having a polymerizable terminal methylene group and at least one other polymerizable unsaturated grouping. Among the appropriate carboxylic acids are acrylic, α-alkylacrylic, maleic, and itaconic acids. Examples of suitable cross-linking agents include divinyl benzene, ethylene glycol dimethacrylate, allyl methacrylate, butadiene, allyl methyl maleate, and diallyl itaconate. In some cases it may be convenient to copolymerize the unsaturated carboxylic acid in the form of an ester or anhydride and hydrolyze the resulting polymer, but where the cross-linking agent contains a hydrolyzable ester group such procedure will sometimes not be practical. For the purposes of the present invention the copolymers of acrylic or methacrylic acid with divinyl benzene will ordinarily be preferred because of their ready availability and excellent stability. The concentration of divinyl benzene employed is not critical. However, for optimum physical properties resins prepared from polymerization mixtures containing at least about 1% divinyl benzene will usually be selected, and for efficient utilization of resin capacity a level not exceeding about 16% divinyl benzene is preferred. Resins prepared at even higher divinyl benzene concentrations may be utilized but their capacity for dithiazanine is lower. Particularly preferred are the copolymers of acrylic or methacrylic acids with about 4–6% divinyl benzene.

Suitable sulfonic acid resins for purposes of the present invention are those products prepared by sulfonating an insoluble, infusible polymer containing a plurality of aromatic groupings. For example, sulfonated phenol-formaldehyde resins may be employed, but it is preferred to utilize the readily available sulfonated copolymers of styrene-divinylbenzene. As in the case of the carboxylic polymers, resins prepared from polymerization mixtures containing from about 1 to 16% divinyl benzene are desirable, and levels of 1–4% divinyl benzene have especially good capacity for dithiazanine.

Suitable sulfonic and carboxylic acid resins are commercially available, and have been described in the literature, as, for example, in U.S. Patents 2,191,853; 2,366,007; 2,518,420; 2,319,359; 2,333,754; 2,340,110 and 2,340,111.

Many of the resins employed in the present invention are commercially available, while the others are readily prepared by methods well known to those skilled in the art. They may represent mixtures polymerized in bulk and later ground to a convenient particle size, or they may be suspension polymers prepared in fine beadlet form. Particle sizes ranging from 100 to 200 mesh or finer are most acceptable to the patient and are therefore preferred.

In preparing these novel dithiazanine derivatives the finely-divided resin, whether of the carboxylic or the sulfonic type, will first be converted to the form of a pharmaceutically acceptable salt, for example, to the sodium, potassium or ammonium form. This is readily accomplished by treating the resin in the acid form with a corresponding base in a manner well known to those skilled in the art.

For adsorption by the resin it is important that the dithiazanine salt first be placed in solution. Since these compounds are soluble in water only to the extent of about one part in about 50,000, adsorption from pure water solution is largely impractical. It has been found, however, that these salts are readily adsorbed from solution in aqueous methanol or aqueous dimethyl formamide. Those solutions containing from about 50 to about 75% water usually give best results. For relatively high solubility and good adsorption, temperatures of from about 35 to 45° C. are especially preferred, although higher or lower temperatures may be used. The dithiazanine solution may be passed over the resin contained in a column but it is more convenient to conduct batchwise adsorption in a tank or other vessel equipped with means for agitation.

The reaction which takes place between the dithiazanine and the resin apparently involves an exchange phenomenon, and the original halogen or other anion is no longer detachable. Under optimum conditions dithiazanine is adsorbed on the resin to the extent of one mole to each one to two moles of carboxylate or sulfonate grouping. Absorbates of remarkably high potency may be prepared in this manner; those containing as high as 500–750 mg. dithiazanine bromide equivalent per gram of adsorbate, or even higher, are practical. (By this is meant that the resin adsorbate upon elution will yield dithiazanine equivalent to this quantity of the bromide.) The progress of the adsorption is conveniently followed by withdrawing liquid samples and determing the concentration of unadsorbed dye by optical density measurement.

When the adsorption rate has dropped to a very low value, indicating substantial completion of the reaction, the solid absorbate is permitted to settle out and the clear supernatant liquor is decanted. The resulting heavy slurry may be filtered on paper and the filter cake washed and dried to an equilibrium moisture content.

The novel resin derivatives of dithiazanine prepared in the foregoing fashion are found to retain unimpaired the anthelminthic activity corresponding to their dithiazanine content. Their effectiveness is particularly surprising in view of the fact that prolonged stirring with synthetic gastric juice (1.4 g. sodium chloride, 0.5 g. potassium chloride, 0.06 g. calcium chloride and 3.2 g. pepsin in 1 liter of 0.1 N HCl) or intestinal medium (10 g. sodium bicarbonate and 1 g. pancreatin in 1 liter of water) fails to elute any measurable quantity of the dye from the resin adsorbates. In the laboratory special elution techniques, hereinafter described, are necessary for assay of the adsorbates.

The undiluted powders may be supplied in hard gelatin capsules; or tablets or capsules each containing the equivalent of 25–250 mg. dithiazanine iodide together with various excipients and lubricants such as lactose, corn starch, magnesium stearate, etc., may be supplied. These novel adsorbates may also be blended with solid foodstuffs; in addition, they may be administered in jellies or as suspensions in aqueous and non-aqueous vehicles. Those containing the equivalent of from about 20 to 100 mg. dithiazanine iodide per ml. in sugar syrups or aqueous polyols may, for example, be employed.

While these new reaction products are particularly useful in human therapy, they are also quite suitable for veterinary use. For administration to animals, it is convenient to prepare a feed concentrate having a 5–15% concentration of the adsorbate, which may be partially diluted with grain for separate feeding or blended with the total daily ration to a final concentration of .05–.15% of adsorbate.

These products are surprisingly free from side-effects, and do not tend to cause nausea or vomiting. A total daily dosage of the equivalent of about 2 to 10 mg. of dithiazanine iodide per pound of body weight, administered in divided doses, is usually effective. Ordinarily, in the human host the total daily dosage need not exceed 600 mg. Depending on the type and severity of the infestation, treatment will usually be continued for from about 5 to 21 days.

The following examples are furnished for purposes of illustration and should not be interpreted as limiting the invention, the scope of which is defined by the appended claims.

Example I

A cation exchange resin is prepared in the following manner: a mixture of inhibitor-free styrene together with 1% divinyl benzene and 0.5% benzoyl peroxide is added to twice its volume of water in a reaction vessel equipped with agitator and reflux condenser. A trace of magnesium carbonate is added to facilitate suspension and the mixture is vigorously agitated and heated at reflux until polymerization is complete. The resulting bead polymer is separated, washed and sulfonated by heating at 100° C. with excess concentrated sulfuric acid in the presence of 1% silver sulfate for 10 hours. The sulfonated copolymer is washed and converted to the sodium form by leaching with aqueous sodium hydroxide. Washing, drying, and screening yield a resin having a particle size ranging from about 125 to 200 mesh, a moisture content of about 5% and a total exchange capacity of about 5 meq. per gram.

500 g. dithiazanine bromide is added to a stirred mixture of 7 gallons of water and 20 gallons of methanol at 40° C. and stirring is continued until the dye is completely in solution. An additional 13 gallons of water is then added, followed by 500 grams of the cation-exchange resin. Stirring is continued for two hours, when adsorption of the dye is found to be substantially quantitative. The slurry is permitted to settle, the supernatant liquor is decanted, and the remaining liquor is separated by filtration on paper. After washing with a mixture of equal volumes of methanol and water, and then with water, the resin adsorbate is dried at 65° C. for 24 hours to a moisture content of about 5%. The product contains the equivalent of 560 mg. of dithiazanine (expressed in terms of the bromide) per gram.

For assay purposes, the dithiazanine activity may be eluted from the resin in the following manner:

0.1 gram of adsorbate is placed in 200 ml. dimethyl formamide with stirring, and 5 grams of calcium chloride and 20 ml. water are added. The slurry is agitated for 5 hours and a sample is diluted with methanol to an appropriate dilution (usually 1:200). The optical density is then read at 650 m$\mu$ against a methanol blank. The dithiazanine concentration may then be calculated from the extinction coefficient $$(\epsilon_{1cm.}^{1\%} = 4500)$$

Example II 750 g. dithiazanine bromide is dissolved in a mixture of 30 gallons of water and 30 gallons of methanol at 35° C. and the solution is treated with 400 grams of a sulfonated copolymer of styrene with 4% divinyl benzene in the sodium cycle. After stirring at 35° C. for two hours absorption of the dye is still incomplete. An additional 60 gallons of water are added and stirring is continued for 30 minutes more, to achieve 98% adsorption. The liquor is separated and discarded, and the adsorbate is washed with 25–75 methanol-water, then with water, and dried at 90° C. The product contains the equivalent of 750 mg. dithiazanine (expressed in terms of the bromide) per gram.

Example III

The experiment of Example I is repeated with a sulfonated copolymer of styrene with 16% divinyl benzene. 26% dye adsorption is achieved and the liquor is recovered for recycle to another adsorption step with fresh resin.

Example IV 1100 g. dithiazanine iodide is dissolved in 10 gallons dimethyl formamide at 45° C. and 10 gallons of water are added. While stirring at 45° C. 500 grams of a powdered copolymer of methacrylic acid with 5% divinyl benzene is added. The resin has a moisture content of about 9% and a maximum exchange capacity of about 9 meq. per gram. It is employed in the potassium cycle.

Several hours' stirring leads to substantially quantitative adsorption. The separated adsorbate is thoroughly washed with acetone, then with water, and dried at 90° C. The product contains the equivalent of 375 mg. dithiazanine (expressed in terms of the bromide) per gram. The product may be assayed according to the procedure described in Example I, with the substitution of methanol for dimethyl formamide.

*Example V*

The experiment of Example IV is repeated with a copolymer of acrylic acid and 5% divinyl benzene in the ammonium cycle, and successful adsorption is again achieved.

*Example VI*

Resin adsorbates of dithiazanine iodide are successfully prepared following the procedure of Example I, with the following resins:

a. A copolymer of acrylic acid with 1% divinylbenzene in the sodium cycle.
b. A copolymer of acrylic acid with 16% divinylbenzene in the sodium cycle.
c. A copolymer of methacrylic acid with 1% divinyl benzene in the potassium cycle.
d. A copolymer of methacrylic acid with 16% divinyl benzene in the potassium cycle.
e. A sulfonated thermoset phenol-formaldehyde resin in the sodium cycle.
f. A hydrolyzed copolymer of maleic anhydride, styrene and divinyl benzene in the sodium cycle.
g. A hydrolyzed copolymer of diethyl fumarate, styrene and divinyl benzene in the sodium cycle.
h. A copolymer of methacrylic acid and ethylene glycol dimethacrylate in the potassium cycle.
i. A hydrolyzed copolymer of dimethyl itaconate and divinyl benzene.

*Example VII*

A statistically significant number of mice infected with the rodent pinworm *Syphacia obvelata* are treated once daily for two days by the oral route with the product of Example IV at a level of 10.4 mg. adsorbate per kilogram of body weight (equivalent to 3.9 mg./kg. expressed in terms of dithiazanine bromide). A second treated group receives 3.9 mg./kg. dithiazanine bromide. At the end of the second day the mice are sacrificed and the cecal content examined. Both groups of treated animals show a marked reduction in worms over untreated controls, to about the same degree in both treated groups.

*Example VIII*

The products of Examples I–III and V–VI are evaluated as in Example VII and are also found to have significant anthelmintic activity.

*Example IX*

The dithiazanine resin adsorbates of Examples I and IV are filled into gelatin capsules (100 mg. dithiazanine iodide equivalent per capsules) and are administered to human patients suffering from helminth infestation in a daily dosage of 600 mg. per patient for 10 days. These substances are found to be effective and substantially free from unpleasant side effects.

*Example X*

A table base is prepared by blending the following ingredients in the indicated weight proportions:

Sucrose U.S.P. _____ 80.3
Tapioca starch _____ 13.2
Magnesium stearate _____ 6.5

Into this base is blended sufficient dithiazanine resin adsorbate, prepared as described in Example I, to provide tablets each containing the equivalent of 50 mg. of dithiazanine iodide.

*Example XI*

Into the tablet base of Example X is blended sufficient dithiazanine resin adsorbate to provide tablets each containing the equivalent of 100 mg. dithiazanine iodide. Six of these tablets constitute the usual adult daily dosage.

*Example XII*

The preparations of Examples X and XI are repeated, utilizing the product of Example IV in place of the product of Example I.

*Example XIII*

5 parts by weight of the adsorbate of Example I are blended into the following composition:

Parts
Dehydrated alfalfa meal _____ 35
Ground yellow corn _____ 50
Bone meal _____ 10

1.5% of the resulting concentrate may be blended with a balanced ration for administration to animals harboring helminth infection.

What is claimed is:

1. An anthelmintic agent adapted for oral administration comprising the reaction product of a dithiazanine salt and a pharmaceutically acceptable salt of a particulate synthetic cross-linked cation exchange resin selected from the group consisting of carboxylic resins and sulfonic resins, said reaction product being formed by contacting a solution of the dithiazanine salt with the pharmaceutically acceptable salt of a particulate synthetic cross-linked cation exchange resin.

2. The agent of claim 1 wherein said dithiazanine salt is selected from the group consisting of dithiazanine bromide and dithiazanine iodide, and said resin salt is selected from the group consisting of the sodium salt, the potassium salt and the ammonium salt of said resin.

3. The agent of claim 1 wherein said resin is in the form of particles of a maximum size of approximately 100 mesh.

4. The agent of claim 1 wherein said resin represents the salt of a copolymer of divinyl benzene and a monomer selected from the group consisting of acrylic acid and methacrylic acid.

5. The agent of claim 4 wherein said divinyl benzene is introduced in a concentration ranging from about 4 to about 6% by weight of said copolymer.

6. The agent of claim 1 wherein said resin is the salt of a sulfonated copolymer of styrene and divinyl benzene.

7. The agent of claim 6 wherein said divinyl benzene is introduced in a concentration ranging from about 1 to about 4% by weight of said copolymer.

8. The process of treating helminth infection which comprises the daily oral administration to the host of a pharmaceutical composition comprising the anthelmintic agent of claim 1 at a level of from about 2 to about 10 mg. dithiazanine iodide equivalent per pound of body weight.

References Cited in the file of this patent
UNITED STATES PATENTS 2,841,526   Gustus _____ July 1, 1958
2,893,914   McCowen _____ July 7, 1959

FOREIGN PATENTS 217,067   Australia _____ Mar. 15, 1956